(12) United States Patent
Jones (10) Patent No.: US 7,103,030 B2
(45) Date of Patent: Sep. 5, 2006

(54) ADAPTIVE FREQUENCY HOPPING STRATEGY

(75) Inventor: Huw Bryn Jones, Reading (GB)

(73) Assignee: VTech Communications, Ltd., Hong Kong (HK)

(*) Notice: Subject to any disclaimer, the term of this patent is extended or adjusted under 35 U.S.C. 154(b) by 878 days.

(21) Appl. No.: 10/038,394

(22) Filed: Jan. 2, 2002

(65) Prior Publication Data

US 2002/0186749 A1 Dec. 12, 2002

(30) Foreign Application Priority Data

Jan. 3, 2001 (GB) .................................. 0100093.4

(51) Int. Cl.
*H04J 1/00* (2006.01)
(52) U.S. Cl. ...................... 370/343; 370/480; 375/132
(58) Field of Classification Search ........ 370/310–350, 370/431–463, 480; 375/132
See application file for complete search history.

(56) References Cited

U.S. PATENT DOCUMENTS

| | | | |
|---|---|---|---|
| 4,937,822 A | 6/1990 | Weddle et al. | |
| 5,323,447 A | 6/1994 | Gillis et al. | |
| 5,541,954 A | 7/1996 | Emi | |
| 5,809,059 A | 9/1998 | Souissi et al. | |
| 5,937,002 A * | 8/1999 | Andersson et al. | 375/131 |
| 6,108,366 A * | 8/2000 | Haartsen | 375/134 |
| 6,112,094 A * | 8/2000 | Dent | 455/452.1 |
| 6,115,407 A | 9/2000 | Gendel et al. | |
| 6,480,721 B1 * | 11/2002 | Sydon et al. | 455/464 |
| 6,549,784 B1 | 4/2003 | Kostic et al. | |
| 6,687,239 B1 * | 2/2004 | Koprivica | 370/341 |
| 6,760,319 B1 * | 7/2004 | Gerten et al. | 370/335 |

FOREIGN PATENT DOCUMENTS

| | | |
|---|---|---|
| EP | 0182762 A1 | 5/1986 |
| EP | 0767550 A1 | 4/1997 |
| GB | 2 228 163 | 8/1990 |
| GB | 2277231 A | 10/1994 |
| GB | 2340695 A | 2/2000 |
| GB | 2 365 710 | 2/2002 |
| JP | 0729776 | 1/1995 |
| JP | 09020086 | 1/1997 |
| WO | WO 92/12481 | 7/1992 |
| WO | WO 95/08246 | 3/1995 |
| WO | WO 99/38344 A1 | 7/1999 |
| WO | WO 99/66652 | 12/1999 |

OTHER PUBLICATIONS

GB Search Report.
GB Search Reports, Jul. 9, 2003.

* cited by examiner

*Primary Examiner*—Seema S. Rao
*Assistant Examiner*—Michael J. Moore
(74) *Attorney, Agent, or Firm*—Pillsbury Winthrop Shaw Pittman LLP (57) ABSTRACT

A technique for controlling the frequency allocation in the hop sequence of a frequency hopping digital communications system is presented. The hop sequence is initially formed such that consecutive channels are likely to differ substantially in frequency. Therefore, channel substitution commands can be transmitted twice on consecutive hops without acknowledgement, inasmuch as the likelihood of a broadband noise source blocking consecutive channels is reduced. The number of channels identified as requiring substitution in the hop sequence is monitored, such that a hop sequence repair operation or communications link termination can be implemented if channel substitution data traffic becomes too great.

15 Claims, 5 Drawing Sheets

ADAPTIVE FREQUENCY HOPPING STRATEGY

BACKGROUND OF THE INVENTION

1. Field of the Invention

This invention relates in general to wireless digital communications. In particular, the invention relates to a frequency hopping strategy for use in frequency hopping spread spectrum communications.

2. Background Art

Devices incorporating wireless communications techniques are becoming increasingly prevalent in modern society. An inevitable result of this trend is that frequency spectrums will become more crowded and increasingly prone to interference. At the same time, consumers are becoming increasingly concerned about the privacy and security of communications. Consequently, systems engineers designing a variety of wireless communications systems, including cellular and cordless telephones, are increasingly turning to digital spread spectrum signaling methods to achieve better voice quality, greater security, and more efficient bandwidth utilization than can be achieved with other signaling methods, such as amplitude or frequency modulation without bandwidth spreading.

One popular spread spectrum signaling technique is frequency-hopping spread spectrum ("FHSS") protocols. A FHSS transceiver operates by rapidly changing its tuned carrier frequency in a known pattern, called the hop sequence or hop pattern. By using different hop sequences, multiple users can communicate simultaneously over differing communications channels all within a common frequency bandwidth. FHSS offers better voice quality than other solutions in noisy environments because when a short segment of voice data is transmitted on a "bad" channel, it is simply muted. Thus, when the number of bad channels in the hop sequence is relatively low, the resultant degradation in voice quality is not noticeable to the user.

Another aspect of FHSS systems which is particularly advantageous is the ability to circumvent static sources of interference at a particular frequency by dynamically changing the frequency channels in the hop sequence, substituting a new frequency channel for a channel that has been identified as having excessive noise. Numerous methods of monitoring channel performance and determining when a channel should be removed from the hop sequence are known in the art.

However, typical prior art FHSS systems simply randomize the entire pool of frequency channels, before selecting an initial subset of channels on which communication is to occur, thereby leaving a random pool of reserve channels ready for substitution. Thus, oftentimes adjacent channels in the hop sequence will be similar in frequency. When this occurs, a broadband source of interference could block several consecutive channels in the hop sequence. This circumstance results in greater sound quality degradation through longer periods of "muted" audio, and inhibits the data communications that are required for implementation of dynamic channel allocation techniques.

SUMMARY OF THE INVENTION

An improved technique for hop sequence channel selection and substitution in a frequency hopping communications system is presented. In accordance with one aspect of the invention, an initial hop sequence is derived by dividing the plurality of frequency channels over which communications may occur into subsets, such that the frequency ranges of channels within each subset do not overlap. The frequencies within each subset are pseudo-randomly permuted, where the particular permutation is unique to the communications link for which the hop sequence is derived. The hop sequence is then formed by combining channels from the subsets such that no two channels from the same subset are adjacent to one another (e.g. by interleaving the subsets). Available frequency channels that are not incorporated into the hop sequence are reserved for use as spare frequencies.

In accordance with another aspect of the invention, the spare frequencies are ranked such that they can be substituted into the hop sequence, as required, in order of rank. The received signal strength is measured for each of the unused, spare frequency channels to identify the level of noise present on each channel. The spare channels are ranked in order of ascending received signal strength.

During operation of the communications link, noisy channels that require substitution are identified, such as through the detection of errors in consecutive transmissions on the frequency channel. In accordance with one aspect of the invention, a congestion control value is derived based upon the number of frequency channels in the hop sequence that have required substitution to reflect the resultant increase in the amount of traffic on the link imposed by such channel substitutions. If the congestion control value is below a first threshold level, the identified channel is substituted with one of the spare channels by transmitting an unacknowledged substitution command on two consecutive frequency hops.

If the congestion control value exceeds the first threshold value, but remains below a second threshold, then a repair process is initiated, whereby the entire hop sequence is communicated over the communications link. If the congestion control value exceeds the second threshold, then the communications link is not of sufficient quality to carry on communications, and the link is shut down in an orderly manner by the communications system.

DESCRIPTION OF THE INVENTION

While this invention is susceptible to embodiment in many different forms, there are shown in the drawings and will be described in detail herein specific embodiments. The present disclosure is to be considered as an exemplification of the principle of the invention intended merely to explain and illustrate the invention, and is not intended to limit the invention in any way to embodiments illustrated.

The drawings describe a system for allocating frequency channels in an FHSS system. For simplicity, the embodiments illustrated are based on a single handset cordless telephone system. However, it is understood that the invention can readily be utilized in conjunction with multiple handset cordless telephones, as well as other wireless frequency hopping communications systems.

Figure 1:
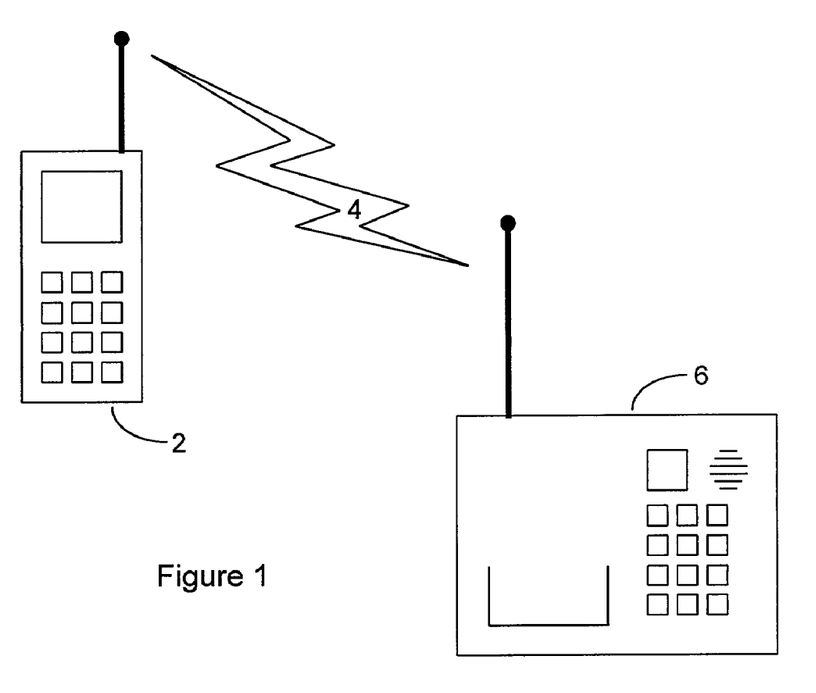
FIG. 1 is a schematic diagram illustrating a communications system in which the invention can be implemented.

FIG. 1 of the drawings depicts a FHSS communication system comprised of cordless telephone handset 2 and base station 6. Handset 2 and base station 6 communicate via a wireless FHSS communication link 4.

Figure 2:
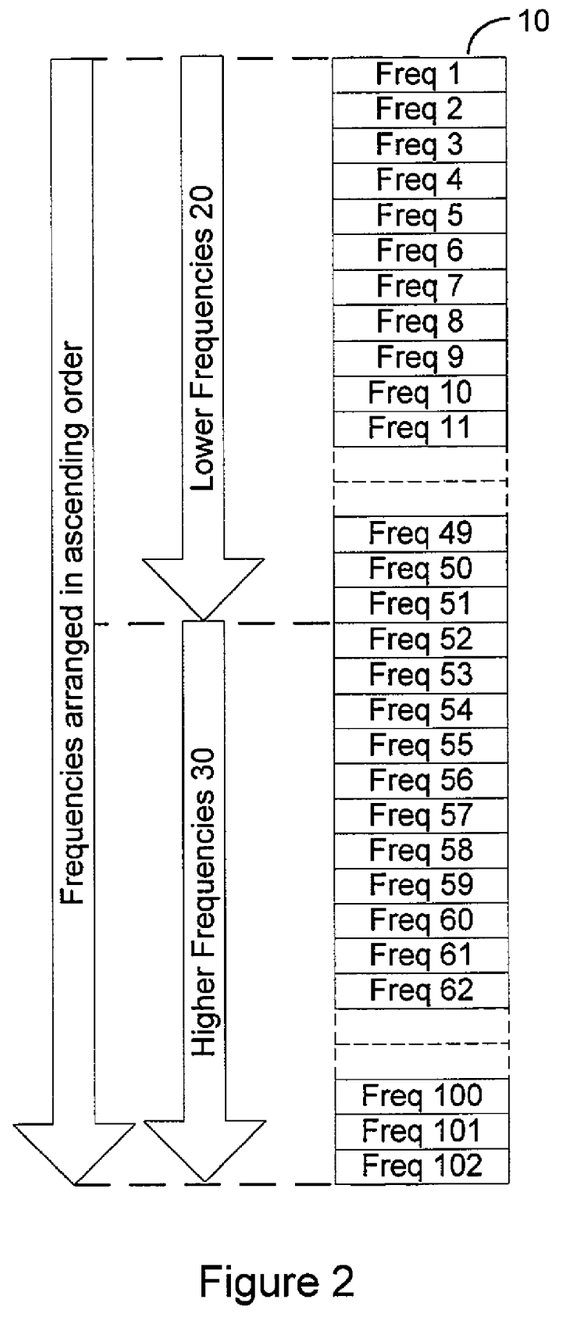
FIG. 2 is a table of frequency channels in a frequency hopping communications system from which the hop sequence is derived.

FIG. 2 illustrates a memory table 10, which stores each frequency channel allocated within the FHSS communications system. In the embodiment of FIG. 2, 102 different frequencies are provided. Each channel in table 10 occupies one byte of RAM. Specifically, seven bits of each byte are required to identify the frequency number, while the spare eighth bit of each byte can be used as a "noise flag" to track errors on each channel without requiring any additional memory allocation. The noise flag provides an indication as to whether an error was present in data received on a particular frequency during the previous transmission thereon. The channels in table 10 are initially sorted consecutively by frequency, such as the ascending order depicted in FIG. 2.

The pool of channels available for communications is divided into a plurality of sub-tables, each comprised of channels within non-overlapping frequency ranges. As illustrated in FIG. 2, table 10 is divided into two sub-tables 20 and 30. The channels within each sub-table are then permuted independently according to the output of a pseudo-random number generator (not shown). For example, a 32-bit linear feedback shift register (LFSR) can be implemented using Galoise feedback within a general purpose microprocessor. In one embodiment, the pseudo-random number generator is seeded by a 32-bit binary number that is derived from ID numbers unique to base station 6 and handset 2, which will communicate using the resultant hop sequence. For example, station-specific unique ID numbers can be utilized to generate the pseudo-random number generator seed. This ensures that, at least initially, each communication link in the FHSS system will utilize a different hop sequence.

Figure 3:
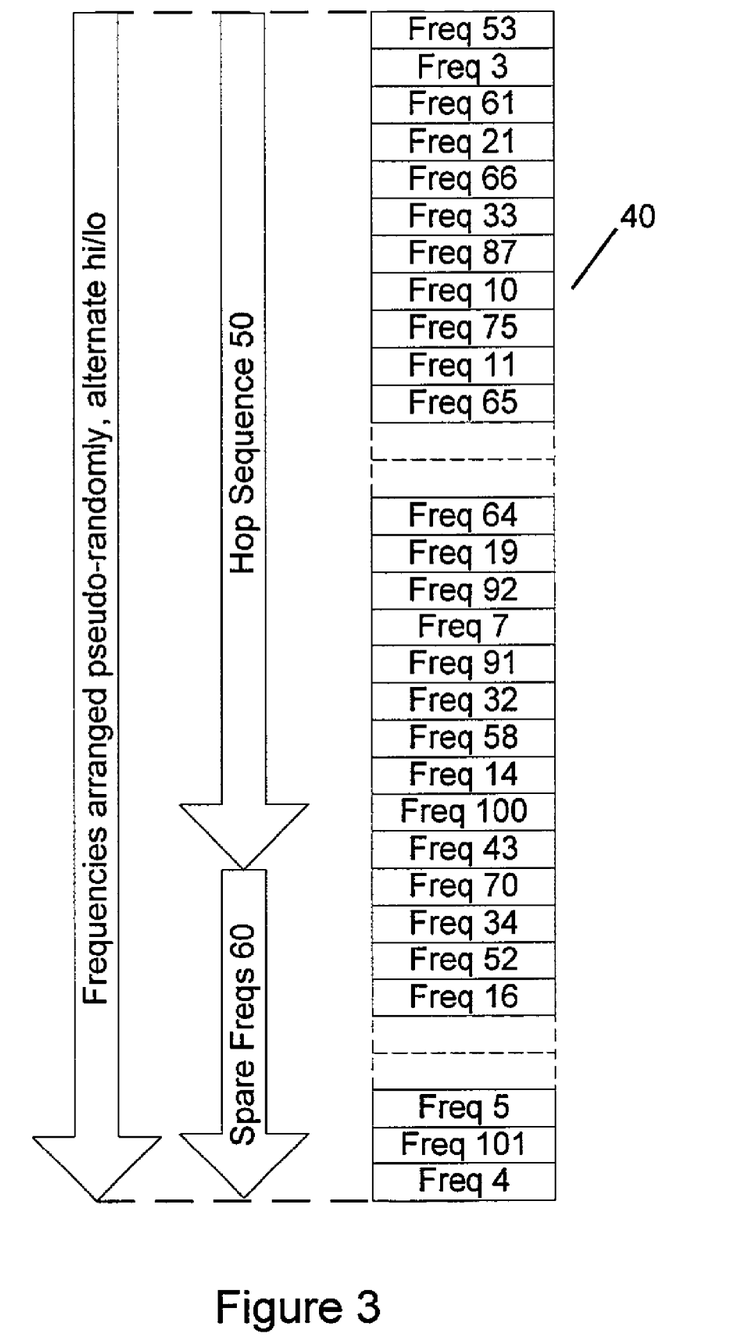
FIG. 3 is a table of frequency channels demonstrating a hop sequence and a set of spare channels according to the illustrated embodiment of the invention.

Permuted sub-tables 20 and 30 are interleaved to generate a master channel table 40 (FIG. 3). The resulting table of frequencies alternates between higher-frequency channels (from table 30) and lower-frequency channels (from table 20). Master table 40 is then subdivided into a set of working frequencies 50, which comprise the initial hop sequence over which communications between handset 2 and base station 6 will occur, and spare channel set 60, comprised of frequencies that are not part of the initial hop sequence but are reserved for use as substitute channels.

Figure 4:
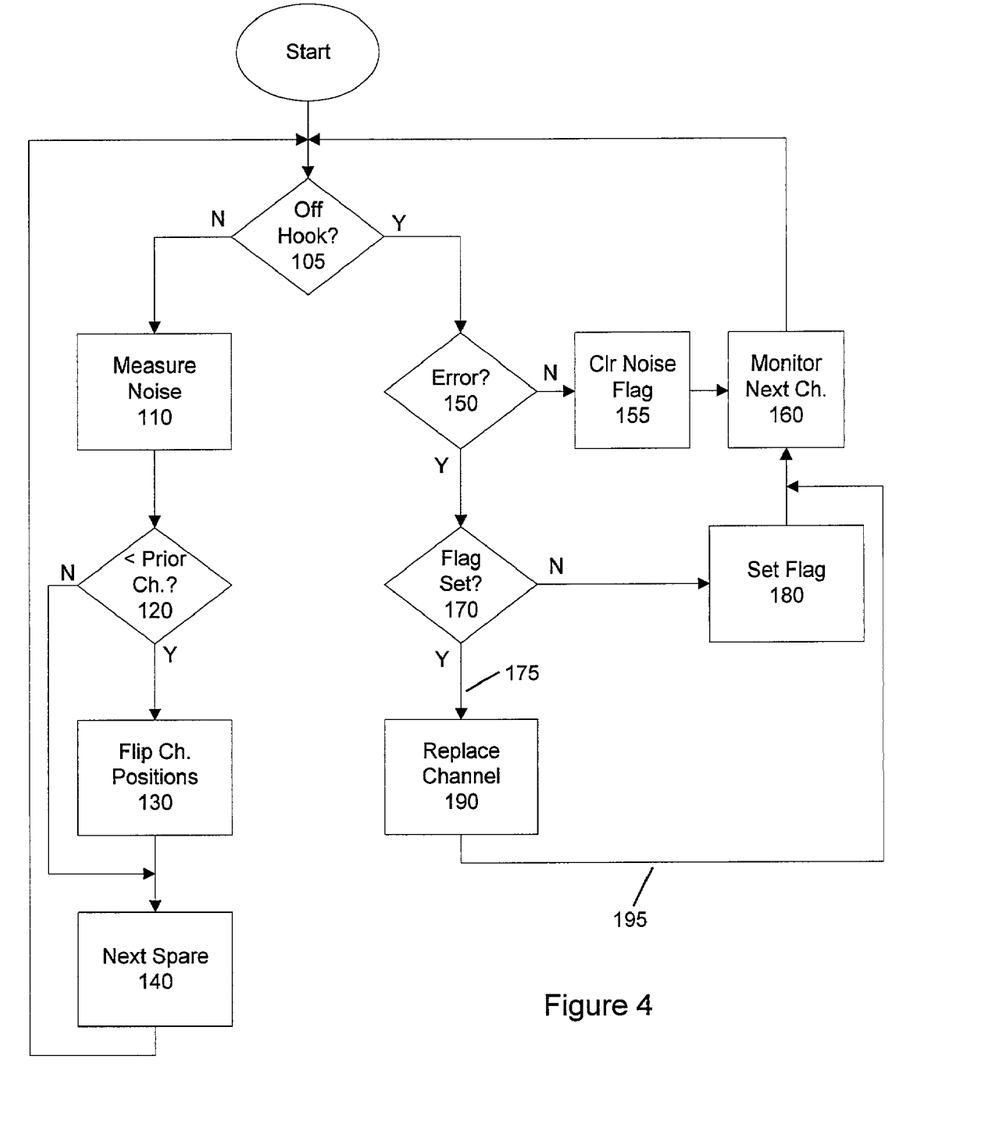
FIG. 4 is a flow chart illustrating the operation of a cordless telephone embodiment of the invention.

The channel allocation procedures implemented during operation of the cordless telephone set are depicted in FIG. 4. Operation is first determined by whether or not the telephone set is in an off-hook condition (i.e. being actively used for voice communications), step 105. If the telephone set is not off-hook, such as when the handset is resting unused, a frequency monitoring protocol can be implemented so that bad or noisy frequency channel within spare channel set 60 are not substituted into the hop sequence when the communications link is later used to conduct a call. In the illustrated embodiment, the frequency monitoring protocol is implemented in base station 6, such that handset 4, which is typically battery-powered, remains largely idle to conserve power.

While on-hook, base station 6 proceeds to sequentially measure the received noise power on each frequency in the set of spare channels 60, step 110. For each spare frequency, base station 6 determines whether the received noise power is less than that measured on the frequency preceding it in channel set 60, step 120. If the noise power on the active channel is less than the noise power on the preceding channel, then the active and preceding frequency values should be swapped, step 130, such that the "cleaner" frequency is ranked higher than positioned before the noisier frequency in spare channel set 60. Otherwise, the channels remain in their existing orientation. Base unit 6 then proceeds to the next channel in set 60, step 140, and repeats the aforementioned process.

Once the last channel in spare set 60 has been measured, base station 6 returns to the first channel in set 60 and begins the monitoring process anew. In this way, base station 6 ranks the frequency channels in spare set 60 in descending order of quality, from cleanest to noisiest, so that in actual operation the quietest spare frequency channel can immediately be selected when dynamic channel allocation is required. Thus, while other methods for selecting a spare channel during a channel substitution procedure could readily be implemented, this particular method allows for the rapid selection of a clean channel without further computation, while requiring only minimal processing and memory overhead by utilizing only a single extra reusable stack in memory to store the noise level of the prior channel in the hop sequence.

If the telephone set is off-hook in step 105, such that an active communications link has been established between handset 4 and base unit 6, then a frequency substitution protocol can be implemented to maintain a high quality level of frequency channels used in the hop sequence. The protocol described ensures that both ends of the communications link maintain a common hop sequence, while requiring only a modest control data bandwidth between the base station and handset.

Base station 6 monitors communications link 4 on a hop-by-hop basis, detecting the presence of errors in the data transmitted during each hop, step 150. Such errors can be detected by standard error detection and/or correction mechanisms known in the art of digital communications. If no data error occurs on a particular hop sequence channel, then the noise flag for that channel is reset, step 155, and the process repeats as the system proceeds to monitor the next channel in the hop sequence step 160.

In the illustrated embodiment, a frequency channel is deemed to be "bad" (and thus in need of replacement) if it fails to propagate without error on two successive occasions. Therefore, transient interference sources do not needlessly invoke a channel substitution that would result in associated control data traffic capable of quickly consuming the very limited bandwidth that is often allotted for control data signalling between the base station and handset. If an error is detected in received data, then the noise flag for the active channel, stored in hop sequence table 50, is checked in step 170. If the noise flag has not already been set, then it is set in step 180, and the process continues to monitor the next channel in the hop sequence. If the noise flag is set already, indicating that a second consecutive transmission on the active frequency channel has been corrupted, then the active channel is replaced, step 190, before the process repeats.

Figure 5:
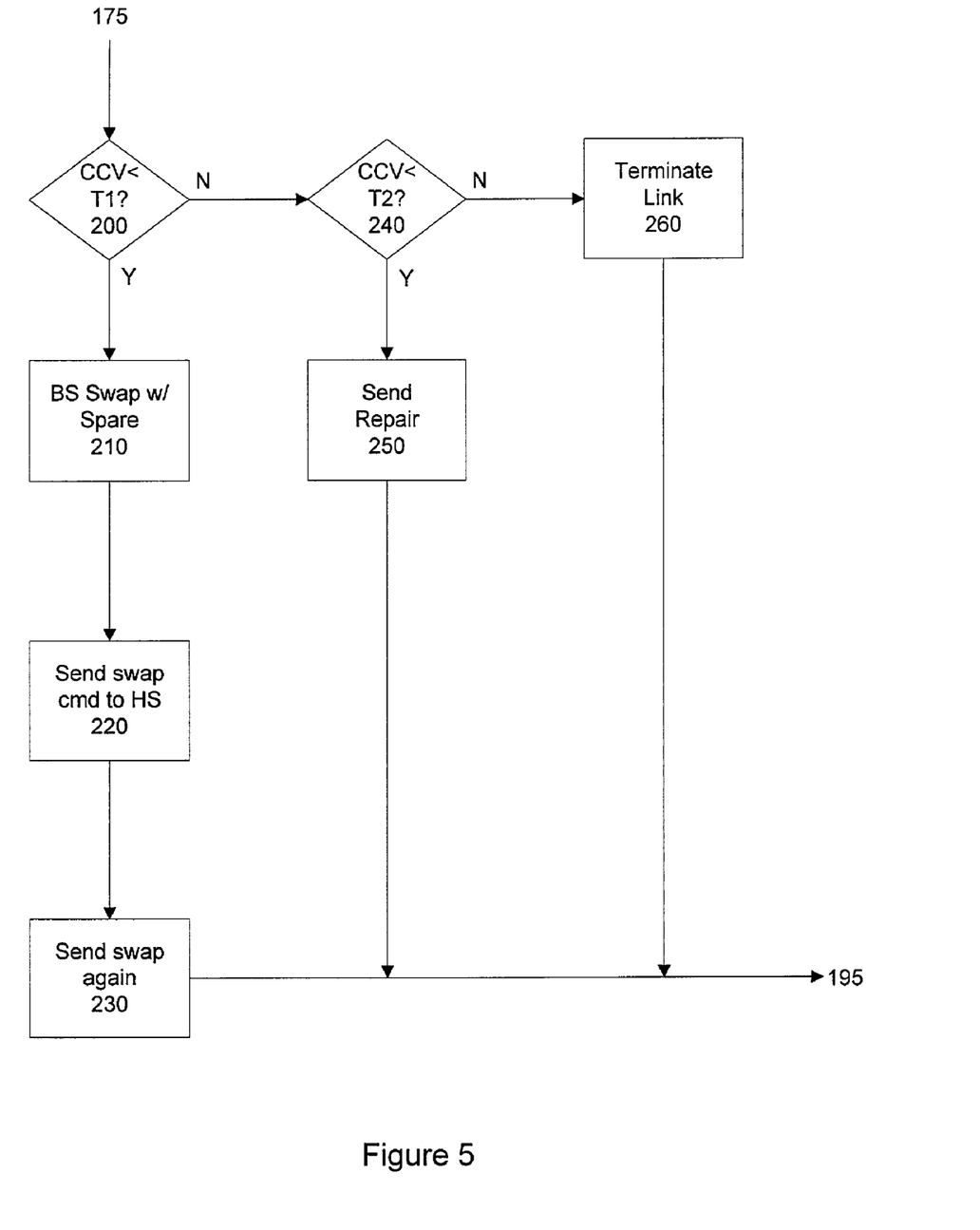
FIG. 5 is a flow chart depicting the hop sequence channel substitution process according to the illustrated embodiment.

Channel replacement process 190 is depicted in FIG. 5. The illustrated embodiment employs several techniques in implementing channel replacement, to including automatic resend, automatic repair, and congestion control. In accordance with the congestion control feature, the response of base station 6 to the detection of a bad channel in the hop sequence is dependent upon the number of channels that have been identified as requiring replacement. Performing a large number of channel substitutions (such as may occur when a voice link is being established for the first time) can potentially degrade a communications link that is already poor, such that the control data congestion may block other traffic on the link. Also, when a satisfactory set of operating frequencies cannot be found, such as when the user of cordless telephone 2 moves out of range from base station 6, the congestion control feature allows the system to shut down the link in an orderly manner. Accordingly, a byte of RAM is assigned to a Congestion Control Value (CCV), which reflects an indicia of communications link quality, such as a running total of channels identified as requiring replacement, the number of errors per rotation through the hop sequence, a moving average of channels requiring replacement, etc.

When a channel is identified as requiring replacement, the CCV is first compared to a first threshold T1 (step 200). If the CCV is less than T1, indicating a moderate level of channel replacement traffic, base station 6 replaces the bad hop sequence frequency with the highest-ranked frequency in spare set 60 (step 210). The "bad" channel that is swapped out of the hop sequence is placed in the lowest rank position in spare set 60.

Once base station 6 swaps out the bad frequency, it must also convey the frequency substitution in the hop sequence to the handset so the handset hop sequence remains synchronized. In some applications, it is undesirable to implement a reliable send/acknowledge/timeout communications protocol for frequency replacement, due to the added complexity, memory and processor overhead and communications bandwidth required thereby. Moreover, under a send/acknowledge/timeout protocol a linear increase in blocked hops can result in an exponential increase in control data traffic, potentially overwhelming a limited allotment of control signaling bandwidth. On the other hand, failure to convey a frequency substitution command across a communications link can cause substantial problems because subsequent communications during the hop sequence position at which the failed substitution occurred will necessarily fail as well. This results in yet further reductions in communications capacity, and increased control data signalling. Moreover, the "new" frequency is potentially wasted, inasmuch as it will be promptly substituted out again regardless of whether or not it is noisy.

Hence, in the illustrated embodiment, an automatic re-send feature is implemented, such that the frequency substitution command packet is immediately transmitted twice on consecutive frequency hops, in steps 220 and 230. Because the set of high frequencies and the set of low frequencies were interleaved during generation of the hop sequence, the consecutive substitution commands are transmitted on a high/low pair of frequencies, thus greatly reducing the chance that both commands will be corrupted due to any given wideband noise or interference source. Transmitting the substitution commands promptly after the channel requiring replacement is identified guarantees that neither substitution command is transmitted on the substituted channel, which may not yet have been implemented by the handset.

The automatic re-send substitution process is thus performed for each frequency that requires substitution, while the CCV remains below a predetermined threshold. If both frequency substitution commands fail to reach the handset, then the new channel will be promptly marked with the noise flag, and subsequently substituted again with further transmission of substitution commands, such that the system is inherently resilient.

Another feature implemented in the illustrated embodiment is automatic repair of the hop sequence. When substitute commands fail despite the aforementioned automatic re-send technique, clean spare frequencies are wasted, and control data traffic rises. Thus, a special repair command is provided which conveys the complete current hardware setting, thus re-synchronising the working frequency sets in handset 2 and base station 6. Thus, if the CCV exceeds first threshold T1, but is below a second threshold T2 in step 240, then a repair command is sent (step 250) to completely resynchronise the base and handset hop sequences.

Finally, if the CCV exceeds second threshold T2 in step 240, such as would occur when clean frequencies cannot be found and the communications bandwidth is being overwhelmed by control data for frequency substitutions, then base station 6 terminates the communications link in an orderly manner, step 260.

The active channel evaluation and substitution process described above with reference to FIGS. 4 and 5 can also be employed in a test mode to verify the quality of a hopping sequence even when the telephone set is not being used to conduct active communications. According to this mode of operation, the base and handset transmit test data over communications link 4, so that the aforementioned procedures could be carried out by monitoring the test data for transmission errors. This "transmission testing" of the communications link may be desirable because mere received signal strength testing on unused frequency channels may fail to account for some factors that can contribute to noise on a communications link during actual use, such as strong adjacent channel interference, varying sensitivity across the communications bandwidth, various noise sources within the transceiver circuitry, etc.

The foregoing description and drawings merely explain and illustrate the invention and the invention is not limited thereto, inasmuch as those skilled in the art, having the present disclosure before them will be able to make modifications and variations therein without departing from the scope of the invention.

I claim:

1. A method for allocating frequencies in a frequency hopping spread spectrum communications link over which data is transmitted from a first transceiver to a second transceiver, the method comprising the steps of:

selecting a hop sequence that is stored in each of the first and second transceivers comprised of a plurality of frequency channels over which the first and second transceivers communicate, the selecting the hop sequence comprising:

dividing the plurality of frequency channels into at least a first subset of channels and a second subset of channels, where each of the channels in the first subset are higher in frequency than each of the channels in the second subset;

permuting the channels within the first subset in a pseudo-random manner;

permuting the channels within the second subset in a pseudo-random manner;

selecting a hop seciuence comprised of channels from the first subset and the second subset, such that two channels from a given subset are not adjacent to one another in the sequence;

identifying a frequency channel in the hop sequence as being unsatisfactory;

performing a frequency channel substitution by replacing the unsatisfactory frequency with an alternative frequency, in the hop sequence of the second transceiver;

transmitting an unacknowledged substitution command a first time by the second transceiver requesting that the first transceiver perform the frequency channel substitution in its hop sequence; and transmitting the unacknowledged substitution command a second time by the second transceiver requesting that the first transceiver perform the frequency channel substitution in its hop sequence.

2. The method of claim 1, in which the step of identifying a frequency channel in the hop sequence as being unsatisfactory is further comprised of the substep of detecting an error in data communicated over the unsatisfactory frequency channel during two consecutive hops on that channel.

3. The method of claim 1, in which the step of transmitting the substitution command a second time occurs on the frequency channel in the hop sequence that immediately follows that during which the substitution command was transmitted the first time.

4. The method of claim 1, in which the step of performing a frequency substitution is further comprised of the substeps of:
ranking a plurality of spare frequencies channels by channel quality;
selecting the highest-ranked spare frequency channel as the alternative frequency.

5. The method of claim 4, in which the substep of ranking the plurality of spare frequency channels is further comprised of the substeps of:
measuring a received signal strength on each spare frequency channel while no communications from the communications system are occurring thereon;
ranking the spare frequency channels in order of ascending received signal strength.

6. A method for generating a frequency hopping sequence in a frequency hopping spread spectrum communications system in which communications occur over a plurality of frequency channels, the method comprising the steps of:
dividing the plurality of frequency channels into a first subset of channels and a second subset of channels, where each of the channels in the first subset are higher in frequency than each of the channels in the second subset;
permuting the channels within the first subset in a pseudo-random manner;
permuting the channels within the second subset in a pseudo-random manner;
selecting a hop sequence comprised of channels taken alternately from the first subset and the second subset such that no two channels from the same subset are adjacent to one another in the sequence.

7. The method of claim 6, where the pseudo-random manner in which the first and second subsets are permuted is determined via a pseudo-random number generator that is seeded with a value unique to one or more devices of which the communications system is comprised.

8. The method of claim 1, wherein the alternative frequency is chosen from a set of spare frequency channels based on a quality of a spare frequency channel, the quality determined by:
measuring the received signal strength on each of the spare frequency channels; and
ranking the spare frequency channels in order of ascending received signal strength.

9. The method of claim 8, in which the received signal strength on each spare frequency channel is measured sequentially through the set of spare frequency channels, and the step of ranking the spare frequency channels is comprised of the substeps of:
determining whether the received signal strength on a particular spare frequency channel is less than that measured on a previous spare frequency channel ranked immediately above the particular spare frequency channel in the set of spare frequency channels; and
switching the positions of the particular spare frequency channel and the previous spare frequency channel if the received signal strength on the particular spare frequency channel is less than that of the previous spare frequency channel.

10. A method for controlling a substitution of frequency channels in a hop sequence of a frequency hopping communications link comprised of a plurality of frequency channels, the method comprising the steps of:
identifying a frequency channel in the hop sequence that requires substitution;
determining a congestion control value indicative of a number of frequency channels in the hop sequence that have been identified as requiring substitution;
substituting the identified frequency channel with a different frequency channel when the congestion control value is less than a first threshold value;
implementing a hop sequence repair operation in which the entire hop sequence is conveyed over the communications link when the congestion control value exceeds the first threshold value.

11. The method of claim 10, which method is further comprised of the step of shutting down the communications link when the congestion control value exceeds a second threshold value, where the second threshold value is greater than the first threshold value.

12. A method for controlling a substitution of frequency channels in a hop sequence of a frequency hopping communications link comprised of a plurality of frequency channels, the method comprising the steps of:
identifying a frequency channel in a hop sequence that requires substitution;
determining a congestion control value indicative of a number of frequency channels in the hop sequence that have been identified as requiring substitution;
substituting the identified frequency channel with a different frequency channel when the congestion control value is less than a threshold value;
shutting down the communications link when the congestion control value exceeds the threshold value.

13. The method of claim 10, in which the step of substituting the identified frequency channel with a different frequency channel is comprised of the substep of transmitting, on two consecutive frequency hops, a command indicative of the frequency substitution required; and which method further includes the preceding steps of:
dividing the plurality of frequency channels into a first subset of channels and a second subset of channels, where each of the channels in the first subset are higher in frequency than each of the channels in the second subset;
permuting the channels within the first subset in a pseudo-random manner;
permuting the channels within the second subset in a pseudo-random manner;

selecting a hop sequence comprised of channels taken alternately from the first subset and the second subset such that no two channels from the same subset are adjacent to one another in the sequence.

14. The method of claim 11, in which the step of substituting the identified frequency channel with a different frequency channel is comprised of the substep of transmitting, on two consecutive frequency hops, a command indicative of the frequency substitution required; and which method further includes the preceding steps of:

dividing the plurality of frequency channels into a first subset of channels and a second subset of channels, where each of the channels in the first subset are higher in frequency than each of the channels in the second subset;

permuting the channels within the first subset in a pseudo-random manner;

permuting the channels within the second subset in a pseudo-random manner;

selecting a hop sequence comprised of channels taken alternately from the first subset and the second subset such that no two channels from the same subset are adjacent to one another in the sequence.

15. The method of claim 12, in which the step of substituting the identified frequency channel with a different frequency channel is comprised of the substep of transmitting, on two consecutive frequency hops, a command indicative of the frequency substitution required; and which method further includes the preceding steps of:

dividing the plurality of frequency channels into a first subset of channels and a second subset of channels, where each of the channels in the first subset are higher in frequency than each of the channels in the second subset;

permuting the channels within the first subset in a pseudo-random manner;

permuting the channels within the second subset in a pseudo-random manner; and selecting a hop sequence comprised of channels taken alternately from the first subset and the second subset such that no two channels from the same subset are adjacent to one another in the sequence.

* * * * *